Figure 1:
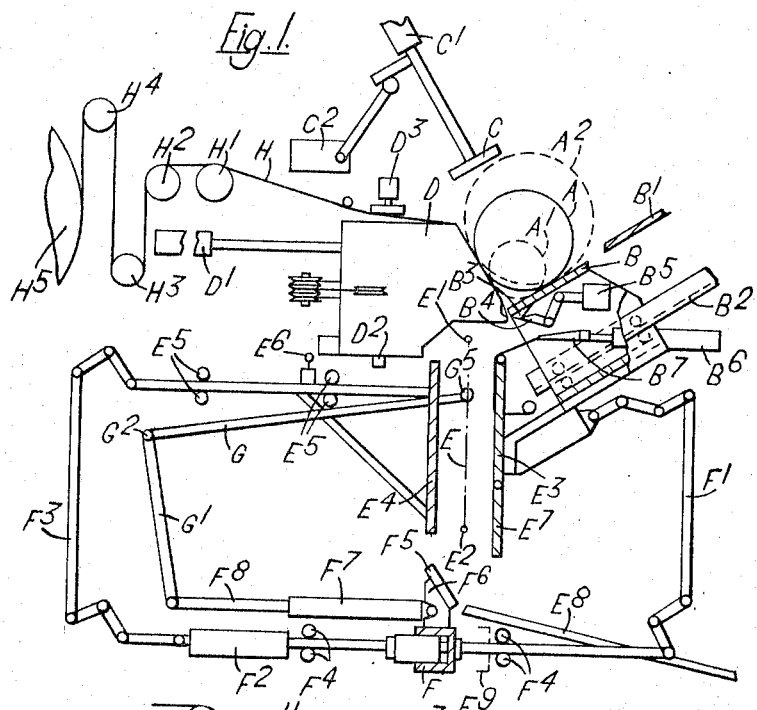

June 6, 1967  J. H. A. S. LAGESSE  3,323,284
APPARATUS FOR HANDLING A WEB OF MATERIAL
Filed Nov. 4, 1963  3 Sheets-Sheet 1

Inventor
J. H. A. S. Lagesse
By
Attorneys

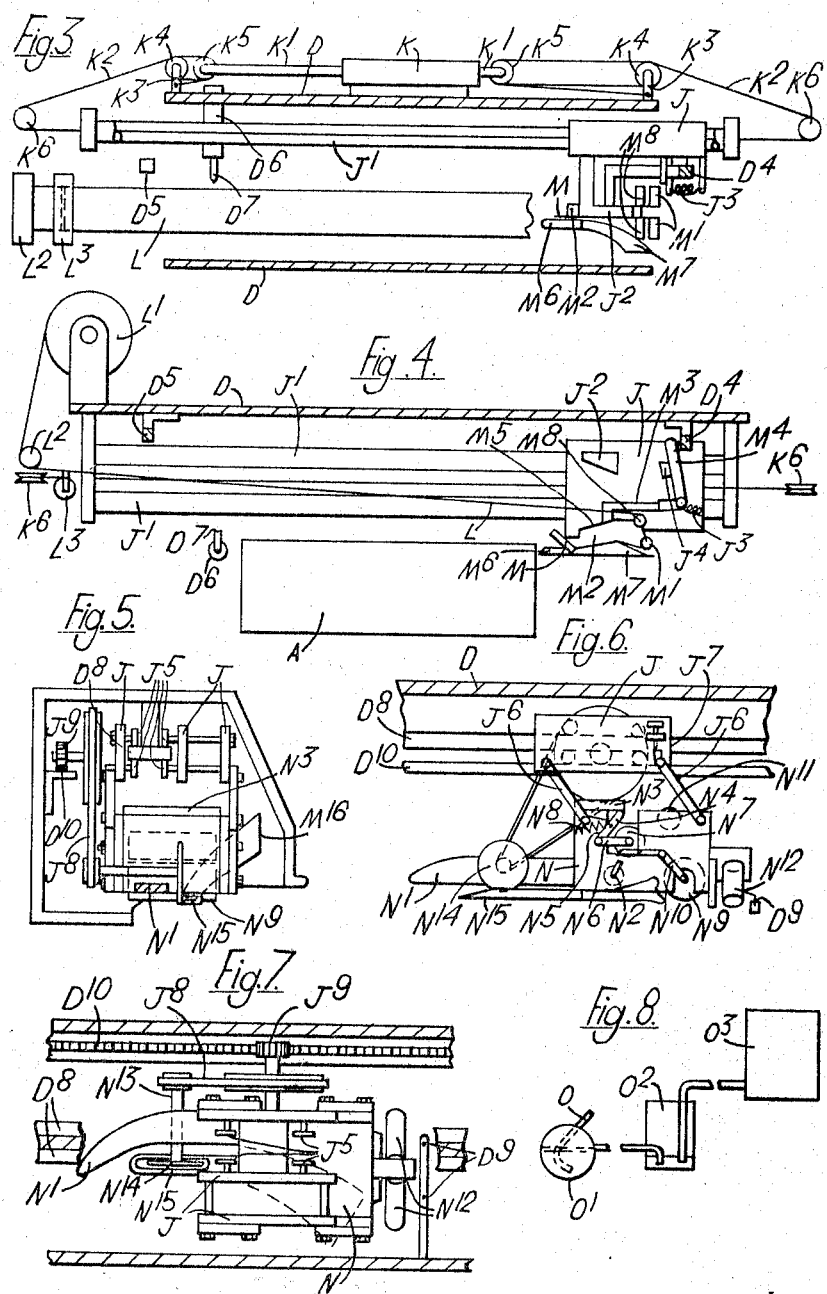

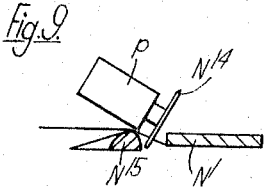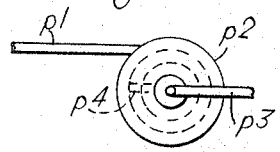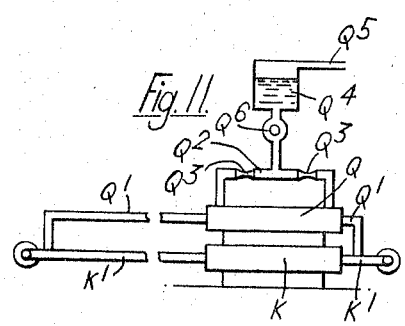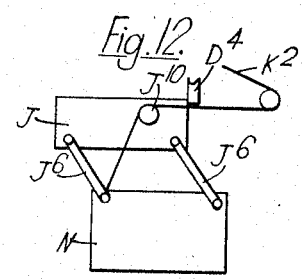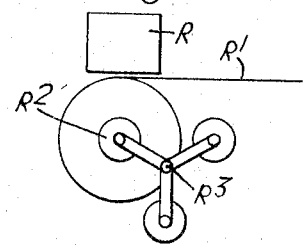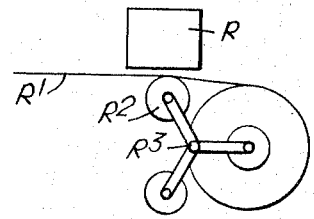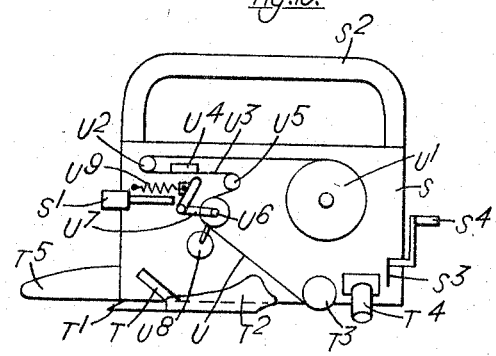

United States Patent Office 3,323,284
Patented June 6, 1967

3,323,284
APPARATUS FOR HANDLING A WEB OF MATERIAL
Joseph Henri Alfred Serge Lagesse, Wembley, England, assignor to Tape Engineering Limited, London, England, a company of Great Britain
Filed Nov. 4, 1963, Ser. No. 321,057
Claims priority, application Great Britain, Nov. 5, 1962, 41,748/62
14 Claims. (Cl. 53—228)

This invention relates to apparatus for handling a web of material, for example paper or plastics material or textile fabric, drawn from a supply reel or other source of supply, and, although applicable to narrow webs, the invention is of especial value for relatively wide webs. Various devices are known for cutting such a web, and it is frequently desired after cutting to seal one of the two new ends of the web in position. Such sealing is usually performed by hand after completion of the cutting operation.

The present invention has for its object to provide a simple and efficient apparatus for carrying out such cutting and sealing in a single operation.

The cutting and sealing unit, according to the present invention, for acting on a stretched web of material drawn from a source of supply, comprises a carriage which is traversed from one side edge of the web to the other, a cutting device mounted on the carriage and operative during such traversing movement to cut the web, and a sealing device mounted on the carriage for pressing one of the new severed end portions of the web against a surface beneath the web and for sealing such new end portion to such surface.

The cutting and sealing unit may be provided with a handle so that the unit constitutes a hand tool, which can be applied to the web and traversed across it by hand for the cutting and sealing operation.

Alternatively, the cutting and sealing unit may form part of a machine, and a further feature of the invention relates to a machine, in which a web of material is drawn from a source of supply, and including means whereby a cutting and sealing unit according to the mean feature of the invention is mounted on a part of the machine for performing a cutting and sealing operation on such web, and means for holding the web in tension during such cutting and sealing operation.

The type of machine may vary widely in accordance with the purpose for which the web is to be used. Thus, for instance, the machine may be one in which the web is manufactured (say, by weaving from threads made from natural or synthetic materials, or in other ways by producing the material in sheet form, as in a paper mill or a machine for producing sheet plastics material or any of the various composite sheet materials used for wrapping or other purposes), wherein the output web from the machine is to be wound into a circular or flattened roll on a former. In some such machines it is necessary to seal the web to the former at the commencement of winding, in which case the web is caused to pass into engagement with the former, the cutting and sealing unit then being operative to cut the web and to press and seal to the surface of the former the new free end of the output web from the machine. For instance, the former may be one of a series of formers on which the web is to be wound in turn, such formers being mounted on a turret or other conveying device which acts when the winding of one former has been completed to cause the web to pass into engagement with the empty next former in readiness for the cutting and sealing operation. In other instances it may be necessary to seal the outer end of the wound roll, in which case the cutting and sealing unit may be operated when the winding is completed to cut the web and to seal the new free end of the portion of the web wound on the former to the exposed layer of the web beneath it.

Another example of machine, in which the cutting and sealing unit according to the invention is especially advantageous, is a wrapping machine for enclosing in wrapping material the peripheral surface of a roll or other package having a generally cylindrical shape of circular or other cross-section, whether consisting of a single article or of an assembly of articles (for example of disc-like or plate-like form), collectively having such shape. In such case, the web is wrapped around the peripheral surface of the package so that the portion of the web from the supply reel or other source overlaps the free end of the web, the cutting and sealing unit being operative after such wrapping to cut the web at a position in which the severed length of the web slightly exceeds that required for encircling the peripheral surface of the package and to press and seal the overlapping ends of the severed portion so that they are securely held in position with such severed portion tightly embracing the periphery of the package. In some instances it may suffice to wrap only the peripheral surface of the package, leaving the ends unwrapped. Alternatively, after the peripheral wrapping has been completed and sealed, the ends may be closed by separate end caps or more usually by arranging that the sealed tube of wrapping material around the periphery of the package projects beyond the ends of the package and by folding such projecting ends of the tube against the ends of the package and sealing them in place, for example by means of an adhesive seal.

Whilst the sealing device of the cutting and sealing unit according to the invention may operate in other ways, as for example by the application of heat when the web is made of a thermoplastic material, the sealing will most commonly be effected by pressing a strip of adhesive tape into engagement with the parts to be sealed together. In some instances, the adhesive on the tape may consist of an adhesive of the pressure sensitive type, in which case the application of pressure alone will suffice to cause its adhesion to the parts to be sealed (means being provided for stripping the protective cover sheet from the tape, if the tape is provided therewith). Alternatively, the adhesive tape may be of the kind requiring wetting for its adhesion, and in this case the cutting and sealing unit will include a wetting device with which the tape is brought into engagement before the sealing operation. Such wetting device may form part of the sealing device so as to move therewith during the traversing movement, a closed tank being mounted on the carriage for feeding the wetting liquid to the wetting device. The liquid is preferably fed from the tank to the wetting device through a constant level device, whereby a substantially constant head of liquid is maintained for the supply to the wetting device, notwithstanding change of level in the tank. The wetting device may comprise a rotatable tube bored with holes and surrounded by a sleeve of absorbent material, against which the adhesive tape is pressed by a roller, the wetting liquid being fed to the interior of the tube and thence through the holes to the absorbent sleeve. Alternatively, the wetting device may comprise a tube or other container to the interior of which the wetting liquid is fed, and a wick-like strip of absorbent material which protrudes from a longitudinal slot in the container and engages with the adhesive tape.

The adhesive tape will usually be drawn from a supply reel, and such reel may be mounted on the carriage so as to move therewith during the traversing movement. When the cutting and sealing unit forms part of a machine, however, the arrangement may be such that, prior to its operative traversing movement during which the cutting and sealing is effected, the carriage is caused to perform an inoperative traversing movement in the opposite direction, so that the cutting and sealing operation is always effected during traversing in one and the same direction across the web. In such case, the supply reel from which the adhesive tape is drawn, although forming part of the cutting and sealing unit, may not participate in the traversing movements of the carriage, such reel during the inoperative traversing movement in readiin such a position that the tape passes close to the starting point of the inoperative traversing movement of the carriage, means being provided on the carriage for gripping the tape at or before the beginning of such traversing movement whereby the tape is drawn from the supply reel during the inoperative traversing movement in readiness for the sealing operation during the subsequent operative traversing movement, means also being provided for severing the tape at or after the end of such operative traversing movement. Conveniently, the sealing device includes one or more rollers for pressing the wetted tape firmly into engagement with the parts to be sealed together, such roller or rollers, when brought into engagement with the parts to be sealed, acting to cause the gripping means to release the tape and to cause the tape to be brought into engagement with the wetting device.

In order to provide adjustability of positioning of the cutting and sealing devices during the operative traversing movement and also, where necessary, to avoid interference with the web during the inoperative traversing movement, such devices are preferably supported on a framework movably mounted on the main body of the carriage and carrying a probe which can ride on the web for locating and cutting and sealing devices correctly in their operative positions. The framework may also carry a member which engages under the web and acts as an abutment for the cutting device. A shaped deflector blade may also be mounted on the framework so as to follow the cutting device during the operative traversing movement, such blade acting to deflect away from the path of the sealing device the new free end of the severed web not requiring to be sealed.

The cutting device may be arranged in various ways, but in a preferred arrangement consists of a rotating disc cutter, the drive for which may be derived through transmission mechanism from the traversing movement of the cutter, or may be independent of such movement.

The carriage may conveniently be traversed along guides by means of a double-acting fluid-pressure device acting on the two ends of the carriage through cords or the like passing over pulleys arranged to give a multiplication ratio whereby the full length of the traversing movement in either direction is effected by a relatively short movement of the piston of the fluid-pressure device. The rotating cutter may be driven through the transmission mechanism from a toothed wheel, which is mounted on the carriage and engages with a rack carried by such guides so as to be rotated thereby during the traversing movement.

When the cutting and sealing unit is incorporated in a wrapping machine of the kind above mentioned, the machine may be arranged in a variety of ways, but preferably the arrangement forming the subject of the present applicant's copending United States patent application Ser. No. 298,046 now Pat. No. 3,290,862, is employed, wherein a retractable head is used to control the feeding of the wrapping material for wrapping the package, and in such case the cutting and sealing unit may conveniently be carried by the retractable head. In one convenient arrangement, the retractable head normally occupies an advanced position in which it obstructs the path of the package to a wrapping position, the web of wrapping material at this stage passing from the supply reel over the retractable head to a clamping device which grips the free end of the web, and the peripheral wrapping of the package is effected by first withdrawing the retractable head away from the clamping device thus causing the web of wrapping material to extend across the path of the package whereby such wrapping material is carried with the package in the movement thereof into the wrapping position and is thus wrapped around a portion of the periphery of the package, whereupon the free end portion of the web is released from the clamping device and wrapped around a further portion of the periphery of the package, the final stage of the peripheral wrapping being effected by returning to retractable head to its advanced position. With such arrangement, it is preferable for the inoperative traversing movement of the carriage of the cutting and sealing unit to be effected whilst the retractable head is in the advanced position before the movement of the package into the wrapping position, the operative traversing movement of the carriage being effected when the retractable head has been returned to the advanced position to complete the peripheral wrapping of the package.

The invention may be carried into practice in various ways, but some convenient alternative constructions of cutting and sealing unit according thereto are illustrated diagrammatically by way of example in the accompanying drawings. These constructions will be described primarily with reference to their use in a wrapping machine for wrapping paper or other wrapping material around the peripheral surface of a roll and in particular to a wrapping machine capable of dealing with rolls having any diameter within a predetermined range (for example from four to ten inches).

Figure 2:
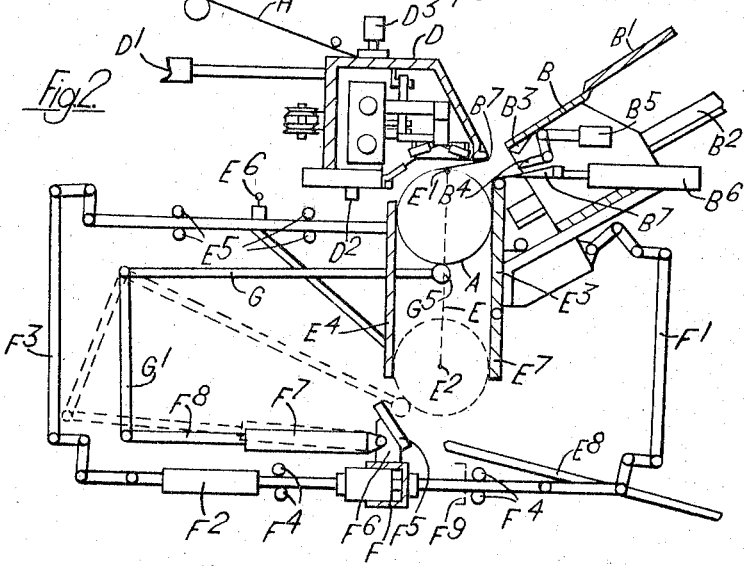

In these drawings,

FIGURES 1 and 2 illustrate in side elevation the application of one construction of cutting and sealing unit to such a wrapping machine, the two figures showing the parts in two different operative positions, FIGURES 3 and 4 show the cutting and sealing unit used in the construction of FIGURES 1 and 2, respectively in plan view and in front elevation, FIGURES 5, 6 and 7 show, respectively in side elevation, in end elevation and in plan, an alternative construction of cutting and sealing unit, FIGURE 8 illustrates a convenient arrangement for the wetting device employed in the construction of FIGURES 5-7, FIGURES 9-12 illustrate modifications of the arrangements of FIGURES 1-8, and FIGURES 13-15 illustrate three further applications of the cutting and sealing unit according to the invention.

The wrapping machine illustrated in FIGURES 1 and 2 is of the kind described in the specification of the present applicant's copending United States patent application Ser. No. 299,024, now Patent No. 3,251,171 (incorporating the retractable head described in the above-mentioned copending application Ser. No. 298,046, and the general arrangement of such machine will first be described, and thereafter the arrangement of the cutting and sealing unit according to the present invention incorporated in such machine.

The main parts of the machine comprise an inclined ramp down which the roll to be wrapped rolls to a gauging position; a retractable head normally occupying an advanced position with its front wall adjacent to the lower end of the ramp and acting to arrest the roll in the gauging position, the cutting and sealing unit being housed within such retractable head; a gauging device for measuring the diameter of the roll; a supply reel from which a web of paper or other wrapping material is drawn over the retractable head; a clamping device located beneath the lower end of the inclined ramp for gripping the free end of the web of wrapping material; a vertical well having walls adjustable in accordance with the roll diameter and within which the wrapping of the roll is effected, a stop device for locating the roll, in accordance with its diameter, in a wrapping position in the well beneath the advanced position of the retractable head; a transfer mechanism, adjusted by the gauging device in accordance with the roll diameter, for locating the stop device correctly for arresting the roll in the wrapping position and subsequently for moving such stop device into a position for locating the roll in a second position, wherein for example the ends of the roll may be wrapped.

Thus, the incoming roll A to be wrapped, which may have any diameter within a predetermined range (the smallest and largest sizes being indicated in dotted line respectively at $A^1$ and $A^2$) is fed into the machine down the inclined ramp, which is formed in two parts B and $B^1$, the lower part B being movable and the upper part $B^1$ fixed. The roll A is arrested in a gauging position by engagement with the front face of the retractable head D, such engagement operating a trip device (not shown) for bringing the gauging device into operation.

The gauging device may be arranged in various ways, but in the example illustrated consists of a sensing plate C, which lies parallel to the incline dramp B $B^1$ and is movable by a pneumatic cylinder $C^1$ in a direction at right angles thereto, so as to engage with the surface of the roll A and thus to measure the diameter thereof. The gauging device actuates a pneumatic control device, indicated at $C^2$, which controls the setting of various parts of the machine in accordance with the roll diameter. This pneumatic control device may be of any of the known types capable of effecting pneumatic control in accordance with the extent of movement of an actuating element.

The vertical well comprises two vertical walls $E^3$ $E^4$, equally spaced on opposite sides of a vertical datum plane E, so that the well lies beneath the advanced position of the retractable head D. These walls $E^3$ $E^4$ are normally spaced apart by a distance equal to the diameter of the smallest size roll $A^1$ in the range, and are moved in the manner described below under the control of the pneumatic control device so as to be separated by a distance equal to the actual diameter of the roll A to be wrapped.

The lower part B of the inclined ramp is movable in a direction parallel to the inclination of the ramp and carries the inner vertical wall $E^3$ with it in such movement, the arrangement being such that the horizontal component of such inclined movement is equal and opposite to the horizontal movement of the outer vertical wall $E^4$, whereby the two walls always remain equally spaced horizontally from the vertical datum plane E in all positions of adjustment.

These, and other, setting movements in accordance with the roll diameter, are effected through the intermediary of a control bar F, which extends across the bottom of the machine in a direction parallel to the axis of the roll A and to the datum plane E, and is movable horizontally at right angles to such datum plane by a pneumatic ram $F^2$ controlled by the pneumatic control device $C^2$, the movement being guided by linear ball bearings diagrammatically indicated at $F^4$. This control bar F is connected through a parallel linkage mechanism $F^1$ to the lower part B of the inclined ramp and to the inner vertical wall $E^3$ to cause such parts to move along fixed guide rails $B^2$ into their operative positions. At the same time, the outer vertical wall $E^4$ is moved horizontally by the pneumatic ram $F^2$ through a parallel linkage mechanism $F^3$, the movement being guided by linear ball bearings diagrammatically indicated at $E^5$.

The control bar F also operates the transfer mechanism in accordance with the roll diameter. Thus the control bar carries two spaced similar cams $F^5$, which together constitute the abutment means to be referred to later. Also secured to the control bar F is a block $F^6$ to which is pivoted one end of a pneumatic cylinder $F^7$ (the "release cylinder"), the piston rod $F^8$ of which is pivoted to the lower end of one arm $G^1$ of a crank lever G, $G^1$ pivoted at $G^2$. The other arm G of this crank lever constitutes the transfer arm which carries at its free end a horizontal shaft on which are mounted rollers $G^5$ constituting the stop device for locating the roll A in position in the vertical well.

The control bar F normally occupies a position spaced horizontally from a zero (indicated at $F^9$) by half the diameter of the smallest roll $A^1$ in the range, and is moved by the pneumatic ram $F^2$ to a position in which it is separated from the zero $F^9$ by half the diameter of the actual roll A to be wrapped. At this stage, the release cylinder $F^7$ is charged with compressed air, so that there is no relative movement between the cylinder $F^7$ and its piston rod $F^8$ and the movement of the control bar is therefore directly transmitted to the crank arm $G^1$, whose length is half that of the transfer arm G. Since the stop device $G^5$ normally lies at a distance equal to the diameter of the smallest roll $A^1$ beneath a fixed horizontal datum line $E^1$ in the datum plane E, it will be clear that the movement of the control bar F will cause the stop device $G^5$ to move down to a position at a distance equal to the diameter of the actual roll A to be wrapped beneath the fixed datum $E^1$. The transfer arm G is of considerable length so that the arcuate path of the stop device $G^5$ deviates only to a negligible degree from the datum plane E.

FIGURE 1 shows the parts in their normal rest position, in which the retractable head D occupies its advanced position over the vertical well $E^3$ $E^4$, with an incoming roll A just arrested in the gauging position by the front wall of the retractable head in readiness to be gauged by the gauging device C $C^1$. At this stage, the free end of a web H of wrapping material is gripped by a clamping device $B^3$ $B^4$, which is carried beneath the lower part B of the inclined ramp and is operated by a pneumatic cylinder $B^5$, the web H passing from the clamping device over the front face of the retractable head D and over fixed guide rollers $H^1$ $H^2$ $H^4$ and a movable compensating roller $H^3$ (between the rollers $H^2$ and $H^4$) to a supply reel $H^5$. The purpose of the compensating roller $H^3$ is to take up slack in the web H, when the retractable head D is withdrawn from its advanced position.

When the various parts of the machine have all been set to suit the diameter of the incoming roll A, a trip device (not shown) is operated to cause operation of a second pneumatic ram $D^1$, which acts to withdraw the retractable head D horizontally away from its normal advanced position. This frees the roll A so that it can move forward towards the wrapping position, but at the same time draws the web H of wrapping material across the path of the roll, so that the roll will carry the wrapping material with it. This further movement of the roll A is arrested by the stop device $G^5$ in the wrapping position, and at this stage the web H of wrapping material passes down from the clamping device $B^3$ $B^4$ along the inner vertical wall $E^3$, tightly round the lower half of the periphery of the roll A, and thence up along the outer vertical wall $E^4$ and over the front face of the retractable head D in its withdrawn position, to the supply reel. The retractable head D carries a projection $D^2$ which strikes a trip device $E^6$ carried by the outer vertical wall $E^4$. This trip device causes the withdrawing movement of the retractable head D to stop (when the front face of the head is approximately above the outer vertical wall) and at once initiates the return movement of the head D back towards the advanced position.

The trip device $E^6$ also causes the pneumatic cylinder $B^5$ to release the clamping device $B^3$ $B^4$ and operates another pneumatic cylinder $B^6$ to cause longitudinal movement of two folder fingers $B^7$ (preferably connected together by a folder bar), so that these fingers (and the folder bar) engage with the released end of the web of wrapping material and fold it closely round part of the upper half of the surface of the roll A. The retractable head D has meanwhile been moving towards its advanced position and has been wrapping the web H around the remainder of the peripheral surface of the roll, so that finally the web will overlap its free edge and grip it tightly against the roll surface. When the head D reaches its advanced position, a trip device (not shown) causes the folder fingers $F^7$ to be withdrawn and also applies a clamp $D^3$ on top of the retractable head to hold the web against being drawn back by the compensating roller $H^3$ when the web is subsequently cut by the cutting device, the web thus being clamped in a state of tension to assist the cutting action.

The various parts of the machine have now reached the positions shown in FIGURE 2 in readiness for the operation of the cutting and sealing device according to the present invention, whereby (as will be described below) the web H is cut and a strip of adhesive tape is applied over the overlapping ends of the web of wrapping material, thus firmly sealing the wrapping around the peripheral surface of the roll. Before describing the operation of the cutting and sealing device according to the present invention, it will be convenient to mention the further stages completing the cycle of operations of the machine after the cutting and sealing operations have been effected.

Thus, on completioin of the cutting and sealing operations, a further trip device acts to cause the compressed air to be exhausted from the release cylinder $F^7$, thus releasing the stop device $G^5$ (whilst still leaving the remaining parts of the machine set in accordance with the roll diameter), so that the peripherally wrapped roll falls down the well $E^3$ $E^4$ until brought to rest by engagement of the stop device $G^5$ with the abutment means constituted by the two cams $F^5$. The shape and position of these abutment cams are such that the stop device $G^5$, when in engagement therewith (as shown in dotted line in FIGURE 2), holds the roll with its axis accurately centered on a fixed datum line $E^2$ in the datum plane E, in readiness for a further operation which may consist in wrapping the ends of the roll, for example in the manner described in the present applicant's copending United States patent applications Ser. Nos. 260,580, now Pat. No. 3,200,564, and 271,227. On completion of such further operation, a pivoted flap $E^7$, constituting the lower part of the inner vertical wall $E^3$, is released to allow the roll to fall on to a delivery chute $E^8$ and to be discharged from the machine. This final movement of the roll operates another trip device (not shown) to cause the pneumatic control device $C^2$ to reset the various parts of the machine, which have been set in accordance with the roll diameter, back to their normal positions in readiness to deal with the wrapping of the next roll, the final operation being the gripping of the new free end of the web H by the clamping device $B^3$ $B^4$ beneath the inclined ramp B $B^1$ and the release of the clamp $D^3$ on top of the retractable head D.

Reverting now to the cutting and sealing unit, one construction of which is shown in FIGURES 2–4, the complete unit is housed in the retractable head D and participates in the withdrawing and return movements thereof. The main parts of the unit, including a cutter and rollers for pressing the adhesive tape on the wrapped surface of the roll, are mounted on a movable carriage J, which is traversed along guides $J^1$ carried by the retractable head from beyond one side edge of the web H of wrapping material to beyond the other side edge thereof. The traversing of the carriage J is effected by a double-acting pneumatic cylinder K, the piston rod $K^1$ of which projects from both ends of the cylinder, by means of two cords $K^2$ passing over pulleys and connected respectively to the ends of the carriage J. In order to enable the piston stroke of the cylinder K to be kept short relatively to the long travel of the carriage, the pulleys are arranged to multiply the drive at an appropriate transmission ratio, for example 4:1. For this purpose, each cord $K^2$ is anchored to a bracket $K^3$ on the retractable head D and passes in turn over four pulleys, two of which $K^4$ are mounted on the bracket $K^3$ whilst the other two $K^5$ are mounted on the piston rod $K^1$, and finally over a further pulley $K^6$ carried by the head D.

The adhesive tape L is drawn from a supply reel $L^1$ mounted on a bracket extending from one end of the top of the retractable head D and passes over one or more guide rollers $L^2$ on the head and thence past a wetting device $L^3$ to the carriage J. The carriage J is normally at the end of the retractable head D adjacent to the tape supply reel L, and, on actuation of the cutting and sealing unit, first makes an inoperative traversing movement to the other end of the retractable head, and then reverses and makes an operative traversing movement back again to its rest position. Thus, the operative traversing movement always takes place in the same direction across the width of the web H of wrapping material, the cutter being mounted in advance of the rollers for applying the tape during such operative movement. The inoperative traversing movement is utilized for drawing the adhesive tape L from the supply reel $L^1$ and the cutter and rollers are raised clear of the web of wrapping material during this movement.

For this purpose, the cutter in the form of an inclined knife blade M and the rollers $M^1$ are mounted on a framework $M^2$ carried by one arm $M^3$ of a crank lever $M^3$ $M^4$ pivoted to the carriage J. The framework $M^2$ also carries the moving jaw $M^5$ of a clamp, the fixed jaw $J^2$ of which is mounted on the carriage J. The crank lever $M^3$ $M^4$ is controlled by a snap-action toggle spring $J^3$ anchored to the carriage J, so that during the inoperative traversing movement the two jaws $M^5$ $J^2$ of the clamp are held tightly in engagement, gripping the adhesive tape L, the framework $M^2$ being in its raised position. At the end of the inoperative traversing movement, the arm $M^4$ of the crank lever strikes a stop $D^4$ on the retractable head D and is swung about its pivot so that the toggle spring $J^3$ brings it into engagement with a stop $J^4$ on the carriage and thereafter holds the framework $M^2$ in its lowered position throughout the subsequent operative traversing movement, the clamp $M^5$ $J^2$ being released. The engagement of the crank arm $M^4$ with the stop $D^4$ also actuates a trip device controlling the pneumatic cylinder K, so as to stop the carriage J and immediately to initiate the operative return movement. FIGURES 3 and 4 show the parts in this position at the beginning of the operative movement. The lowering of the framework $M^2$ brings a reaction element $M^6$ just below the level of the web of wrapping material so that the knife blade M, cooperating with this reaction element, engages with the edge of the web and cuts it as the operative traversing movement proceeds. The reaction element $M^6$ has a shaped rearward extension $M^7$ constituting a deflector blade for deflecting one of the severed ends of the web (namely that connected to the portion of the web from its supply reel) upwardly away from the path of the rollers $M^1$ which follow the cutter M. The adhesive tape L passes over the movable lower jaw $M^5$ of the clamp and is deflected downwardly by a pair of rollers $M^8$ at the rear end of such jaw so as to pass beneath the main sealing rollers $M^1$ which are spring-pressed downwardly. Thus, the sealing rollers $M^1$, which are slightly inclined to one another so as to engage satisfactorily on the curved surface of the wrapped roll, act to press the adhesive tape L firmly over the overlapping ends of the web of wrapping material around the roll, such sealing action taking place progressively across the width of the web immediately after the cutting of the web. At the end of the operative traversing movement, the arm $M^4$ of the crank lever strikes another stop $D^5$ on the retractable head D, thereby causing the crank lever to raise the framework $M^2$ to reapply the clamp on the adhesive tape L. This also operates a trip device, which actuates the pneumatic cylinder K to bring the carriage J to rest, and also operates another pneumatic cylinder $D^6$ on the retractable head for causing a guillotine $D^7$ to sever the adhesive tape L just behind the sealing rollers $M^1$. Such trip device is also utilized to operate the release cylinder $F^7$ of the transfer mechanism, whereby the roll (with its peripheral wrapping sealed in place around it) is moved into its second operative position, wherein its ends may be wrapped.

FIGURES 5–7 show an alternative and preferred construction for the cutting and sealing unit. This construction differs from that above described primarily in that, in its normal rest position, the carriage is at the end of the retractable head remote from the supply reel for the adhesive tape, so that the unit will perform its operative traversing movement immediately it is actuated following completion of the peripheral wrapping of the roll, the inoperative traversing movement taking place after completion of the operative movement, whilst the roll is falling into its second operative position.

The carriage J, in this construction, runs on rollers $J^5$ on guide tracks $D^8$ suspended from the top of the retractable head D and is driven through cords $K^2$ by the pneumatic cylinder K, as in the previous construction. The framework N, in this case, is suspended on parallel links $J^6$ from the carriage J, the lower position thereof being determined by an adjustable stop $J^7$. The framework N occupies this lower position during the inoperative traversing movement, since in this arrangement its path is not interfered with by the roll during such movement. The framework N is moved into its raised position, prior to its operative traversing movement, by means of a forwardly extending probe $N^1$ on the framework, which rides over the wrapped surface of the roll during the return movement of the retractable head D into its advanced position.

The adhesive tape is drawn from the supply reel $L^1$ during the inoperative traversing movement, as in the previous construction, but in this case, the wetting device $N^2$ is carried by the framework N, so that the tape is wetted immediately before being pressed on the wrapping material on the roll. The clamp for gripping the adhesive tape L is carried wholly by the framework N, one jaw $N^3$ being fixed to the top of the framework, whilst the other jaw $N^4$ is carried on one arm $N^5$ of a crank lever $N^5$ $N^6$ pivoted to the framework. The other arm $N^6$ of this crank lever carries a movable roller $N^7$. In the normal rest position, this roller $N^7$ is held in a raised position with the clamp $N^3$ $N^4$ closed by means jointly of a spring $N^8$ and the weight of a further roller $N^9$ acting through a lever $N^{10}$. Shortly after the beginning of the operative traversing movement this roller $N^9$ strikes the edge of the web of wrapping material and is raised thereby, thus releasing the roller $N^7$, whose weight exceeds the force of the spring $N^8$, so that the clamp $N^3$ $N^4$ is opened. The adhesive tape L (omitted from the drawing for simplicity) passes from its supply reel $L^1$ over guide rollers to the clamp $N^3$ $N^4$ and thence round a guide roller $N^{11}$ on the framework N back around the movable roller $N^7$ and beneath the roller $N^9$, which presses it on to the top of the wrapping material, and thence past a pair of inclined rollers $N^{12}$, which complete the application of the tape to the wrapping material on the roll. The downward movement of the roller $N^7$ presses the tape against the wetting device $N^2$. It is found preferable to provide means (such as spikes $D^9$ or a suction cup) carried by the retractable head D for holding the free end of the adhesive tape during the operative traversing movement.

In the construction illustrated in FIGURES 5–7, a rotary cutter is used instead of the knife blade M of the previous construction. The shaft $N^{13}$ for this rotary cutter $N^{14}$ is carried by the probe $N^1$, and is driven through chain and sprocket reduction gearing $J^8$ from a pinion $J^9$ mounted on the carriage J, this pinion engaging with a rack $D^{10}$ carried by the retractable head D, so that the cutter $N^{14}$ is driven by the operative traversing movement of the carriage J itself. An abutment $N^{15}$ for the cutter $N^{14}$ engages beneath the web of wrapping material and also carries a shaped deflector blade $N^{16}$ for deflecting the cut edge of the web away from the rollers $N^9$ $N^{12}$ which press the adhesive tape on to the overlapping edges of the web on the roll.

At the end of the operative traversing movement, when the pivoted roller $N^9$ leaves the edge of the web of wrapping material, the clamp $N^3$ $N^4$ is again applied to grip the adhesive tape, the wetting device $N^2$ going out of action, and (as in the previous construction) the guillotine $D^7$ is operated to cut the tape behind the rollers $N^{12}$, in readiness for the inoperative traversing movement, which follows at once, while the roll is falling into its second operative position.

The wetting device $N^2$ may be arranged in various ways, but in one simple arrangement (shown diagrammatically in FIGURE 8) consists of a wick-like strip O of absorbent material projecting through a longitudinal slot in a tube $O^1$, to the interior of which the wetting liquid is fed from a constant level device $O^2$ fed by a supply tank $O^3$ carried by the framework N, whereby a constant head of liquid is maintained so that the wetting device will be uniformly fed with liquid notwithstanding changes of level of the supply tank $O^3$. Alternatively, the pipe from the constant level device $O^2$ may lead to the interior of a rotatable thick-walled roller surrounded by a sleeve of absorbent material, the roller wall being bored with a number of small radial passages through which the liquid passes to the absorbent sleeve, as the roller is rotated by engagement of the adhesive tape with it.

The foregoing arrangements of cutting and sealing device may be modified in various ways. Thus the rotary cutter $N^{14}$ may be mounted in an inclined plane, so as to cut the web of wrapping material at right angles, as shown in FIGURE 9, to a portion thereof stretched between the abutment member $N^{15}$ and the probe $N^1$. FIGURES 9 and 10 also serve to show the rotary cutter $N^{14}$ driven by a small air turbine P, instead of by the tranversing movement, the air being supplied to the turbine through a hose-pipe $P^1$ coiled around a drum $P^2$ carried by the retractable head D adjacent to the starting point of the operative traversing movement of the carriage. The drum $P^2$ rotates against the action of a spiral spring (not shown) preferably of the constant tension type. The rotary cutter may have a saw edge, and the exhaust from the air turbine may be directed close to the cutting point, so as to prevent the cutter from becoming choked with small fragments of the wrapping material. The air supply to the hose-pipe $P^1$ is taken through an inlet pipe $P^3$, leading through an air-tight packing into the hollow interior of the drum $P^2$, to which the inner-most end of the coil of hose-pipe is connected through a passage $P^4$.

Again, it has been found that, in some circumstances, speed variations are sometimes apt to occur with a pneumatic drive for the traversing movements. This can be overcome by the use of a hydraulic drive or alternatively, as diagrammatically shown in FIGURE 11, by a combined pneumatic and hydraulic drive. In this case, a hydraulic cylinder Q is placed by the side of the pneumatic cylinder K, with its piston rods $Q^1$ rigidly connected to the piston rods $K^1$ of such cylinder. The two ends of the cylinder Q are connected together through a pipe $Q^2$ having restricted portions $Q^3$. A liquid tank $Q^4$, whose air space is subjected to pneumatic pressure through the pipe $Q^5$ is connected to the pipe $Q^2$ through a non-return valve $Q^6$, which prevents any liquid from being forced out of the cylinder Q into the tank $Q^4$, whilst ensuring that the cylinder Q will always remain completely filled with liquid.

FIGURE 12 shows a further modification, which avoids the necessity for the probe $N^1$ (FIGURES 5–7) riding over the wrapped surface of the roll during the forward movement of the retractable head D. In this modification, the driving cord $K^2$ at the end remote from the supply reel $L^1$ for the adhesive tape, instead of being anchored to the carriage J, is passed over a roller $J^{10}$ thereon and is anchored to the framework N adjacent to the pivot point of one of the parallel links J⁶. This ensures that the framework N will be held in a raised position whilst the carriage J is in its normal rest position, but will be lowered slightly during the operative traversing movement, with the probe N¹ then engaging with the wrapped surface of the roll.

The cutting and sealing unit is also applicable to uses other than in the wrapping machine above described. Thus, for instance, the unit may be incorporated in a machine for winding a web on to a former, as for example when the web is derived from the output of a device for manufacturing it, such as a loom for weaving the web from natural or synthetic fibres or an extrusion device for producing a web of plastics material or a paper mill for manufacturing a web of paper. The cutting and sealing unit above described can be used in various ways in such a machine. Thus as indicated in FIGURE 13, the unit R may be used for cutting the web R¹ after it has been wound on to a former R², which may be one of a set of formers mounted on a rotatable turret R³, and sealing the new free end of the web wound on the former on to the exposed layer beneath it, so that the web will not come loose from the finished roll in subsequent handling. Alternatively, as indicated in FIGURE 14, the unit R may be used in association with an empty former R² on the turret R³, on to which the web is to be wound. Thus when the winding of the web on one former has been completed, the turret may be operated to move the full former to a delivery position and an empty former into the winding position, the unit R being then utilised to cut the web R¹ and to seal the new free end of the web coming from the manufacturing device to the surface of the empty former, to ensure that the winding operation will proceed satisfactorily without slip.

Generally, the cutting and sealing unit according to the invention can be usefully employed in any type of machine wherein a web of material needs to be cut and one of its new free ends sealed in position.

Again, a simplified form of the cutting and sealing unit may be used as a hand tool. One such construction is shown in FIGURE 15. In such a hand tool there is no need for a separate framework pivoted to the carriage, and the carriage S itself serves to carry the cutter, in the form of a knife blade T, with the associated abutment member T¹ engaging under the web to be cut and the deflector blade T², and also the single roller T³ and the pair of inclined rollers T⁴ for applying the adhesive tape over the cut web. The adhesive tape U is drawn from a supply reel U¹ on the carriage, and passes over a guide roller U² to a clamp U³ U⁴ and thence over a guide roller U⁵ and a movable roller U⁶ to the main rollers T³ T⁴. The movable roller U⁶ is carried by a lever U⁷ also carrying the moving jaw U³ of the clamp, and is movable simultaneously with the opening of the clamp to press the adhesive tape into engagement with a wetting device U⁸ on the carriage S. The movement of this lever U⁷, which is urged by a spring U⁹ into the normal rest position (with the clamp closed and the adhesive tape clear of the wetting device), is controlled by a self-locking hand knob S¹. The carriage is provided with a handle S² and also carries a guillotine S³, operated by a hand lever S⁴, for severing the adhesive tape.

In operation, the unit is placed with the abutment member T¹ engaging beneath the web to be cut and with the probe T⁵ engaging over such web, and the unit is pulled by the handle S² across the web, so that the knife blade T cuts the web. At the beginning of such cutting movement, the hand knob S¹ its operated to hold the clamp U³ U⁴ open and to hold the adhesive tape U in engagement with the wetting device U⁸ throughout the operating movement. As the cutting of the web proceeds the rollers T³ T⁴ press the wetted tape tightly against the web in the manner above described. After the end of the operative cutting and sealing movement, the hand knob S¹ is released to clamp the tape, so that it will not run loose when not in use, and to withdraw the tape from the wetting device S⁸, and the guillotine S³ is then operated by the hand lever S⁴ to sever the tape behind the inclined rollers T⁴.

It will be clear that the supply reel for the adhesive tape could, if desired, be mounted on the carriage, not only when the cutting and sealing unit is employed as a hand tool, but also when it is incorporated in a machine.

The pneumatic circuits, whereby (in the construction of wrapping machine above described) the pneumatic control device controls the various parts of the machine and the desired sequential operation of the parts of the machine is ensured, are not shown in the drawings, but it will be understood that such circuits may be arranged in any of the well-known ways to ensure the desired operations. It will also be understood that such control may be effected hydraulically or electrically or mechanically or in other ways, if desired, instead of pneumatically.

What I claim as my invention and desire to secure by Letters Patent is:

1. A cutting and sealing unit, for acting on a web drawn from a source of supply and stretched over a surface, comprising a carriage, means for traversing the carriage from one side of the web to the other, a cutting device supported by the carriage and operative during such traversing movement to cut the web, a sealing device supported by the carriage for pressing adhesive tape into engagement with one of the two new end portions of the web severed by the cutting device and also with the surface beneath the web whereby such new end portion is sealed to such surface, a supply reel for the adhesive tape which does not participate in the traversing movement of the carriage, means whereby, prior to its operative traversing movement the carriage is caused to perform an inoperative traversing movement across the web in the opposite direction, clamping means on the carriage for gripping the adhesive tape whereby tape is drawn from its supply reel during the inoperative traversing movement, and means for severing the adhesive tape after completion of the subsequent operating traversing movement.

2. A cutting and sealing unit as claimed in claim 1, including a wetting device supported by the carriage, a roller movably supported by the carriage in a position such that it will engage with the web near the beginning of the operative traversing movement and will be caused thereby to move relatively to the carriage, and means whereby such movement of the roller causes the clamping means to be released and the adhesive tape to be brought into engagement with the wetting device.

3. A cutting and sealing unit as claimed in claim 1, including a framework movably mounted on the carriage and carrying the cutting device and the sealing device, and a probe on the framework for engaging with the web and thereby positioning the framework relatively to the carriage whereby the cutting and sealing devices will be located in their correct operative positions during the operative traversing movement of the carriage.

4. A cutting and sealing unit as claimed in claim 3, including a member on the framework engaging beneath the web and acting as an abutment for assisting operation of the cutting device, and deflecting means on the framework for deflecting away from the sealing device the severed free end of the web not requiring to be sealed.

5. A cutting and sealing unit, for acting on a web drawn from a source of supply and stretched over a surface, comprising a carriage means for traversing the carriage from one side of the web to the other, a cutting device supported by the carriage and operative during such traversing movement to cut the web, a sealing device supported by the carriage for pressing adhesive tape into engagement with one of the two new end portions of the web severed by the cutting device and also with the surface beneath the web whereby such new end portion is sealed to such surface, a wetting device supported by the carriage, an tank on the carriage, a constant level device for maintaining an aproximately constant head in the supply of liquid from the tank to the wetting device, and means for bringing the adhesive tape into engagement with the wetting device before it is pressed into engagement with the parts to be sealed.

6. A cutting and sealing unit as claimed in claim 5, in which the wetting device comprises a container to which the liquid is fed and a wick-like strip of absorbent material which protrudes through a longitudinal slot in the tube for engagement with the adhesive tape.

7. A cutting and sealing unit, for acting on a web drawn from a source of supply and stretched over a surface, comprising a carriage, means for traversing the carriage from one side of the web to the other, a rotatable disc cutter supported by the carriage and operative during such traversing movement to cut the web, a sealing device supported by the carriage for pressing one of the two new end portions of the web severed by the cutting device against the surface beneath the web and for sealing such new end portion to such surface, a rack extending across the width of the web, a pinion on the carriage engaging with such rack during the operative traversing movement of the carriage, and means whereby the rotation of such pinion is caused to drive the rotatable cutter.

8. A machine for wrapping a package, with wrapping material, including a supply reel from which a web of the wrapping material is drawn, means for wrapping the peripheral surface of the package whereby the free end of the web of wrapping material is overlapped on the surface of the package by a portion of the web nearer the supply reel, and a cutting and sealing unit comprising a carriage, means for traversing the carriage across the web of wrapping material adjacent to the overlapping portions of the web on the surface of the package, a cutting device supported by the carriage and operative during such traversing movement to cut the web at a position such that the severed length of the web slightly exceeds that required for encircling the package, and a sealing device supported by the carriage for pressing and sealing the overlapping ends of such severed portion whereby such ends are securely held in position with the severed portion tightly embracing the peripheral surface of the package.

9. A wrapping machine as claimed in claim 8, in which the cutting and sealing unit includes a supply reel which bears adhesive tape and does not participate in the traversing movement of the carriage, means whereby, prior to its operative traversing movement, the carriage is caused to perform an inoperative traversing movement across the web of the opposite direction, clamping means on the carriage for gripping the adhesive tape whereby tape is drawn from the supply reel during such inoperative traversing movement, and means for severing the adhesive tape after completion of the subsequent operative traversing movement.

10. A wrapping machine as claimed in claim 9, in which the cutting and sealing unit includes a framework movably mounted on the carriage and carrying the cutting device and the sealing device, and a probe on the framework for engaging with the web and thereby positioning the framework relatively to the carriage whereby the cutting and sealing devices will be located in their correct operative positions during the operative traversing movement of the carriage.

11. A wrapping machine as claimed in claim 8, in which the cutting and sealing unit includes a source of supply of adhesive tape, a wetting device, and means for bringing the adhesive tape into contact with the wetting device, the sealing device being constituted by means for pressing the wetted adhesive tape into engagement with the parts of the web to be sealed.

12. A wrapping machine as claimed in claim 8, in which the cutting and sealing unit includes a rack extending across the width of the web, a pinion on the carriage engaging with such rack during the operative traversing movement of the carriage, a rotatable disc cutter constituting the cutting device, and means whereby the rotation of such pinion during the operative traversing movement is caused to drive the cutter.

13. A wrapping machine as claimed in claim 8, in which the means for wrapping the peripheral surface of the package includes a clamping device for gripping the free end of the web of wrapping material, a retractable head controlling the feed of wrapping material from the supply reel for wrapping the peripheral surface of the package and normally occupying an advanced position in which it obstructs the path of the package to a wrapping position, means for withdrawing the retractable head from its advanced position and thereby drawing the web of wrapping material across the path of the package, means whereby when the retractable head is withdrawn the package is caused to move into the wrapping position carrying the wrapping material with it whereby such material is wrapped around a portion of the periphery of the package, means for releasing the free end portion of the web from the clamping device and wrapping it round a further portion of the periphery of the package, means for moving the retractable head back to its advanced position and thereby causing the wrapping material to be wrapped around the remaining portion of the periphery of the package and to overlap the free end of the web of wrapping material on the surface of the package, and means whereby the cutting and sealing unit is carried by the retractable head.

14. A wrapping machine as claimed in claim 13, including means whereby the carriage of the cutting and sealing unit is caused to perform an inoperative traversing movement across the web of wrapping material in a direction opposite to that of the operative traversing movement when the retractable head is in its advanced position prior to movement of the package into the wrapping position in readiness for subsequently performing its operative traversing movement when the retractable head has been returned to its advanced position to complete the peripheral wrapping of the package.

References Cited
UNITED STATES PATENTS

| | | | |
|---|---|---|---|
| 3,024,157 | 3/1962 | Beerli | 156—506 X |
| 3,074,467 | 1/1963 | Takts | 156—505 |
| 3,092,534 | 6/1963 | Ward | 156—505 |
| 3,240,092 | 3/1966 | Zimmerman | 83—614 X |

TRAVIS S. McGEHEE, *Primary Examiner.*

L. S. BOUCHARD, *Assistant Examiner.*